United States Patent [19]

Hieda et al.

[11] Patent Number: 4,845,568
[45] Date of Patent: Jul. 4, 1989

[54] IMAGE PICKUP APPARATUS FOR SELECTIVELY STORING ELECTRICAL SIGNALS

[75] Inventors: Teruo Hieda, Yokohama; Kenji Kyuma, Kawasaki; Hideyuki Arai, Tokyo; Masahiro Takei, Yokohama, all of Japan

[73] Assignee: Canon Kabushiki Kaisha, Tokyo, Japan

[21] Appl. No.: 246,936

[22] Filed: Sep. 19, 1988

Related U.S. Application Data

[63] Continuation of Ser. No. 165,352, Feb. 29, 1988, abandoned, which is a continuation of Ser. No. 807,953, Dec. 12, 1985, abandoned.

[30] Foreign Application Priority Data

Dec. 18, 1984 [JP] Japan .................................. 59-266776
Dec. 18, 1984 [JP] Japan .................................. 59-266777
Dec. 18, 1984 [JP] Japan .................................. 59-266779

[51] Int. Cl.⁴ ............................................... H04N 3/14
[52] U.S. Cl. ............................. 358/213.31; 358/213.26
[58] Field of Search ............... 358/167, 213.15, 213.19, 358/213.29, 213.31, 213.26; 357/24 LR

[56] References Cited

U.S. PATENT DOCUMENTS

| | | | |
|---|---|---|---|
| 4,245,164 | 1/1981 | Funahashi | 357/24 LR |
| 4,322,753 | 3/1982 | Ishihara | 358/213 |
| 4,597,013 | 6/1986 | Matsumoto | 358/213 |
| 4,622,596 | 11/1986 | Suga et al. | 358/335 |
| 4,644,403 | 2/1987 | Sakai et al. | 358/213 |
| 4,647,978 | 3/1987 | Kinoshita et al. | 358/213 |
| 4,651,215 | 3/1987 | Bell et al. | 358/213 |
| 4,663,669 | 5/1987 | Kinoshita et al. | 358/213.19 |
| 4,737,841 | 4/1988 | Kinoshita et al. | 358/213.26 |

Primary Examiner—Jin F. Ng
Assistant Examiner—Stephen Brimich
Attorney, Agent, or Firm—Fitzpatrick, Cella, Harper & Scinto

[57] ABSTRACT

An image sensor wherein the charges stored in a pickup unit of image sensing means are excluded and thereafter substantialy storage of charges is performed, is driven to improve the efficiency of charge exclusion and avoid blooming while storing the charges to be excluded and excluding the stored charges.

40 Claims, 11 Drawing Sheets (a)          (b)

Fig. 14
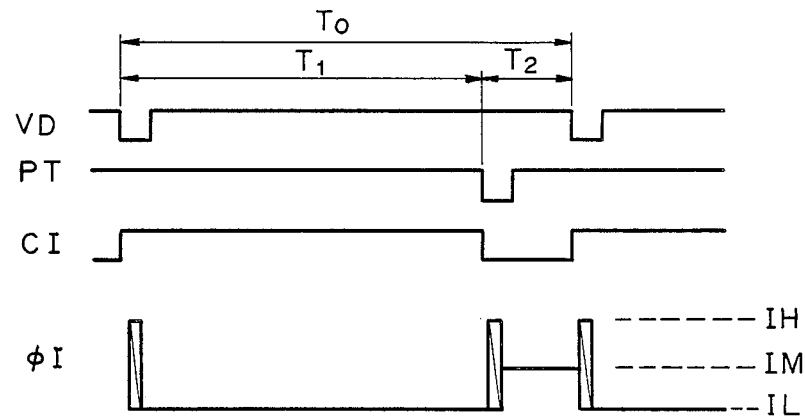
Fig. 15
Fig. 16
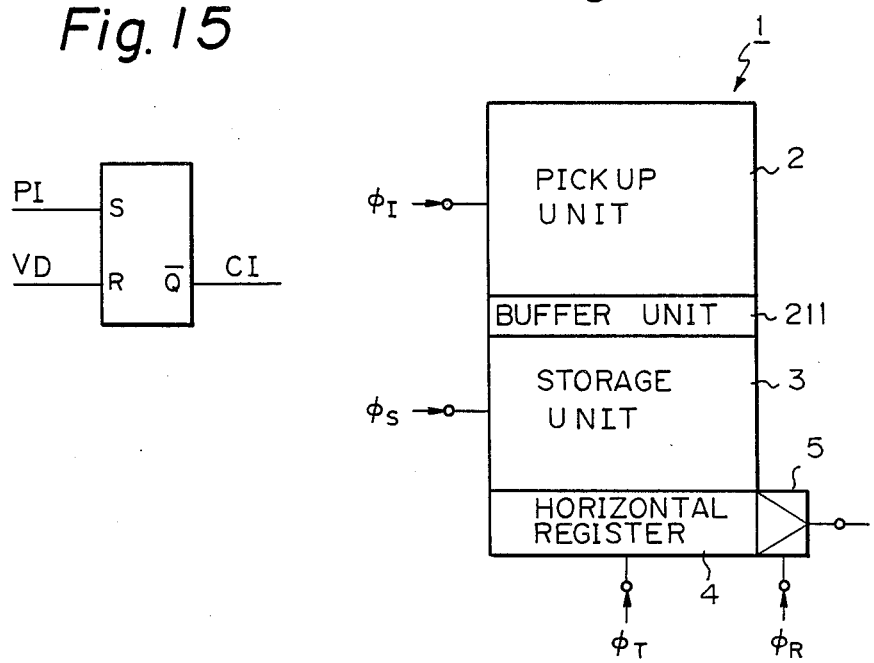

IMAGE PICKUP APPARATUS FOR SELECTIVELY STORING ELECTRICAL SIGNALS

This application is a continuation of application Ser. No. 165,352 filed 2/29/88 which is a continuation of Ser. No. 807,953, filed 12/12/85, both abandoned.

BACKGROUND OF THE INVENTION

1. Field of the Invention

The present invention relates to an image sensor and more particularly, to an image sensor using a solid state image sensing device.

2. Description of the Prior Art

In case that a solid state image sensing element such as CCD (Charge-Coupled Device) is used in a television camera, it has been proposed to make the storage time of the image sensing element shorter than the field (or frame) time of the television signal by changing a drive method of the solid state image sensing element. For instance, assuming that a substantial storage time t1 is 1/500 sec, the ratio of the storage time t1 during which the charges to be excluded are accumulated, to t1 becomes;

$$t2/t1 = (1/60 - 1/500)/1/500 = 7.3$$

which indicates that t2 is about 7.3 times as long as t1. If the charges accumulated during t1 are assumed as a standard level, charged about 7.3 times as much as the standard level are accumulated during t2. If a great amount of charges are accumulated, it is very difficult to exclude all of the charges from the image sensing element without affecting the substantial storage time. Particularly, since for example a highlight part on the screen generates a large amount of charges, a vertical transfer for charge exclusion during the vertical period may cause a large amount of residual charges, thereby resulting in an adverse effect upon an output image.

SUMMARY OF THE INVENTION

The present invention seeks to eliminate the above prior art disadvantages. It is an object of the present invention to provide an image sensor having no adverse effect upon the image even if the substantial storage time is set short.

It is another object of the present invention to make the amount of charges to be accumulated as small as possible so that the image is not affected even if the substantial storage time is set short.

It is a further object of the present invention to make the potential well distribution suitable for excluding charges during the time the charges to be excluded are being accumulated.

BRIEF DESCRIPTION OF THE DRAWINGS

FIG. 14 is a timing chart associated with the image sensor of FIG. 13;

FIG. 15 is a schematic construction of the control signal generator 114 of FIG. 13;

FIG. 16 shows the construction of a third embodiment of the frame transfer type CCD according to the present invention;

DETAILED DESCRIPTION OF THE PREFERRED EMBODIMENTS

The preferred embodiments of the present invention will now be described with reference to the accompanying drawings.

A first embodiment of the present invention will be described by taking a frame transfer type CCD as an example of image sensing means.

Figure 1:
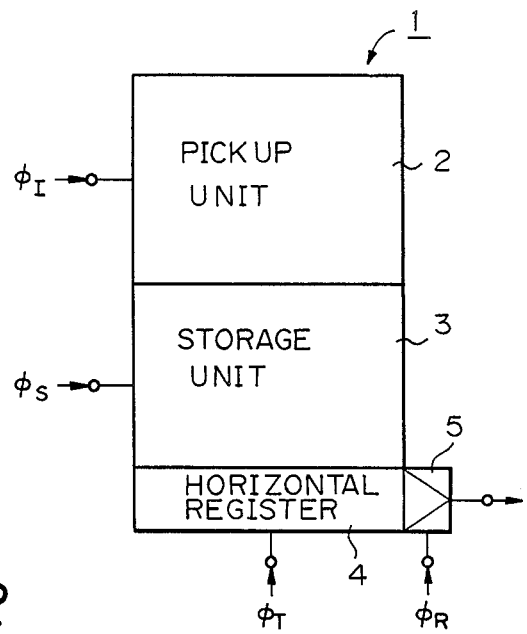
FIG. 1 shows the construction of a first embodiment of the frame transfer type CCD according to the present invention.

Referring to FIG. 1, reference numeral 1 represents generally the frame transfer type CCD. A pickup unit (light reception unit) 2 produces an electrical signal, i.e., electrical charge in response to incident light and accumulates it. A storage unit 3 receives the charges produced and accumulated by the pickup unit 2 and temporarily stores the charges. A horizontal register 4 sequentially reads the charges stored in the storage unit 3 by one line. An output amplifier 5 provided on the output side of the horizontal register 4 converts the charges into voltage.

As well known, the pickup unit 2 is made of a predetermined number of image sensing cells disposed in a two-dimensional configuration along the rows and columns. The storage unit 3 is made of the same number of storage cells disposed in a two-dimensional configuration along the rows and columns. The horizontal register 4 is made of at least the same number of charge transfer cells, as of the storage cells disposed along the column of the storage unit 3, disposed in a one-dimensional configuration along the row. The frame transfer type CCD is shielded from light except the certain area of the pickup unit 2.

In driving the frame transfer type CCD 1 constructed as above in synchro with the television periods, the charges produced and accumulated by the pickup unit 2 are vertically transferred therefrom to the storage unit 3 during the television vertical blanking period. The charges stored in the storage unit 3 are stepwise transferred to the horizontal register 4 by one line during the horizontal blanking period.

The charges in the horizontal register 4 are horizontally transferred to the output amplifier 5 during a one line horizontal period.

In this embodiment, the description is directed to the above frame transfer type CCD, specifically to those CCDs having so-called anti-blooming electrodes. The single-phase drive CCD with anti-blooming gates will be described hereinbelow.

Figure 2:
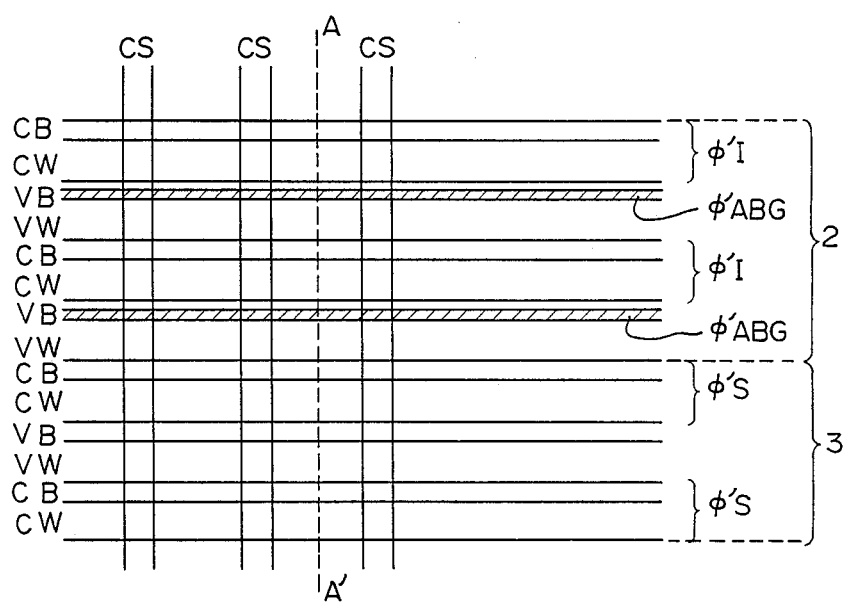
FIG. 2 shows the main part of the electrode arrangement of FIG. 1.

FIG. 2 is the main part of the electrode arrangement near the pickup unit 2 and the storage unit 3 of the CCD.

CS represents a channel stopper separating the horizontal pixels. $\phi'$I stands for a drive electrode at the pickup unit 2, $\phi'$ABG for a drive electrode at the storage unit 3, CB for a drive barrier region, CW for a drive well region, VB for a virtual barrier region, and VW for a virtual well region.

Figure 3:
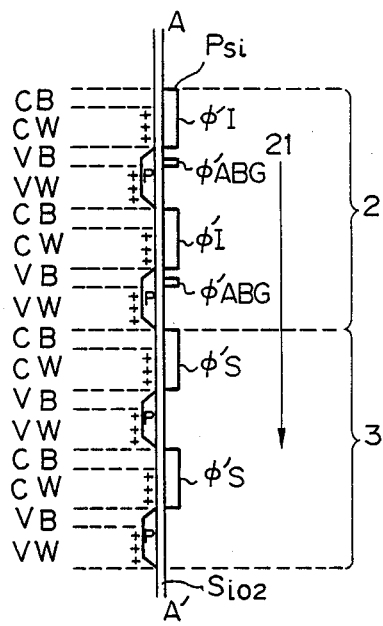
FIG. 3 is a schematic and cross-sectional illustration of FIG. 2.
Figure 4:
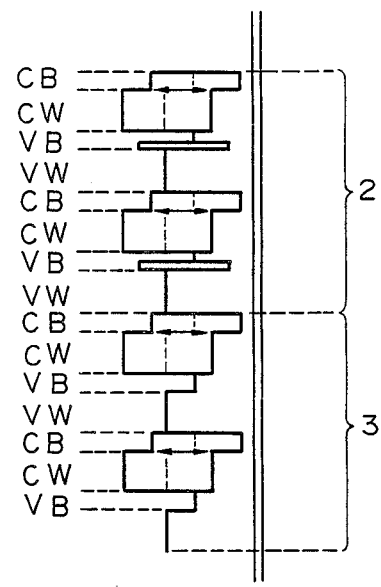
FIG. 4 shows the potential distribution of FIG. 3.

FIG. 3 is a cross-sectional view along A—A' line of FIG. 2, wherein the electrodes $\phi'$I and $\phi'$ABG are made of such as polysilicone. In the regions VB and VW there are formed virtual phase potentials by means of p-ion implantation. Also, n-ions are implanted to form the potential distribution of CB>CW and VB>VW relative to electron. An arrow 21 indicates the direction of transfer in the CCD. FIG. 4 shows the potential distribution of the CCD, wherein in the regions VB and VW the potentials are fixed, while in the regions CB, CW and ABG the potentials vary with the drive voltages as shown in FIG. 4.

Figure 5:
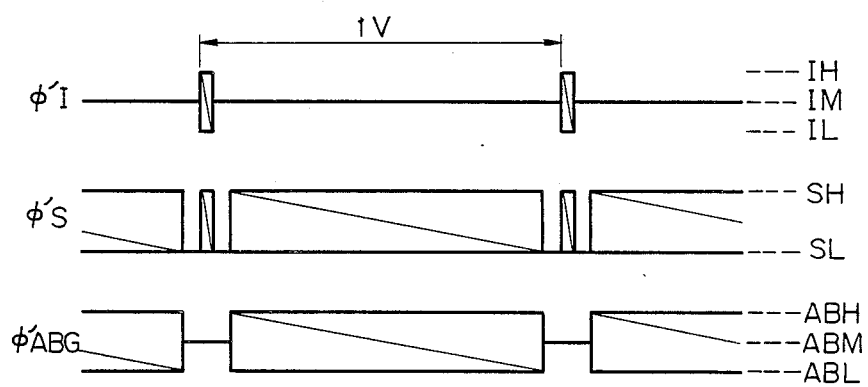
FIG. 5 is a timing chart in a movie photographing mode with the storage time of 1 field.

The drive method of the CCD constructed as above will be described. First, the drive method without exclusion of unnecessary charges will be described. FIG. 5 shows drive voltage waveforms for the CCD, wherein IV represents an one vertical period.

$\phi'$I is supplied with a transfer pulse at the start of the vertical period and takes a middle value IM during the charge storage period except the period the transfer pulse is being supplied. During the storage period, the potential at CW becomes substantially the same as that at VW so that charges are accumulated at both CW and VW. During transfer, the respective charges accumulated in CW and VW are automatically added. In this case, the combination of addition of the charged during transfer is changed and shifted at every field to ensure a change in position of sensitivity gravity center, thus performing an interlace operation.

Simultaneously with the transfer pulse $\phi'$I, the electrode $\phi'$S is supplied with a transfer pulse to carry out charge transfer from the pickup unit to the storage unit. Thereafter, upon reception of a shift pulse occurring once for each horizontal period IH, the charges are transferred from the storage unit to the horizontal register.

$\phi'$ABG is fixed at a preset middle potential ABM between the virtual potentials of the regions VB and VW in order not to interrupt vertical transfer. During the other period, $\phi'$ABG is supplied with consecutive pulses of about 500 KHz to 2 MHz in order to exclude unnecessary charges higher than a preset level by means of charge recombination.

A method of excluding unnecessary charges by means of charge recombination is described in detail, for example in Japanese Patent Application No. 75838/1983 corresponding to U.S. Ser. No. 602,731 filed on April 23, 1984. In this method, by actuating $\phi$ABG, part of storage charges are energized to have the potential of the recombination center, and the charges are recombined with holes, thus periodically excluding unnecessary charges.

Figure 6:
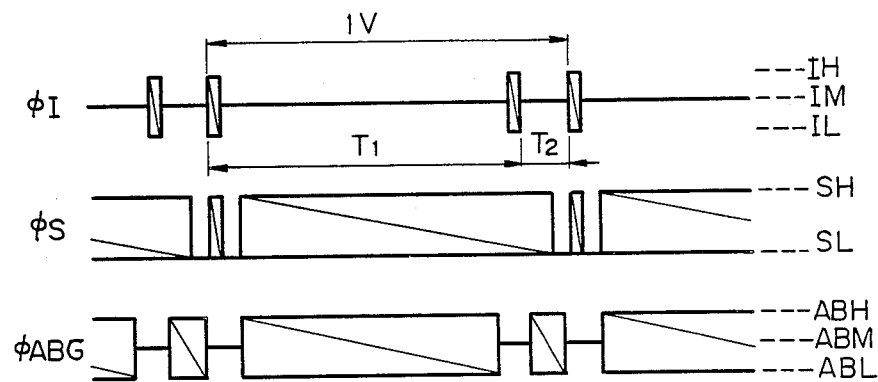
FIG. 6 is a timing chart in a movie photographing mode with the storage time of less thn 1 field.

Next, a drive method of the CCD constructed as in FIGS. 3 and 4 will be described as to how unnecessary charges are excluded. FIG. 6 shows drive voltage waveforms during a so-called electronic shutter operation wherein the vertical charge transfer is performed during the storage period and thereafter, unnecessary charges are excluded to reduce the substantial storage time.

I is applied with another vertical transfer pulse intermediately of the vertical period, which is different from the case with FIG. 5. The charges accumulated during T1 period are excluded in response to the vertical transfer pulse so that T2 becomes the substantial storage time. In order not to interrupt charge transfer even during such a period while the vertical transfer pulse is applied intermediately of the vertical period for exclusion of the unnecessary charges, the drive level of ABG is temporarily made at a middle value.

Figure 7:
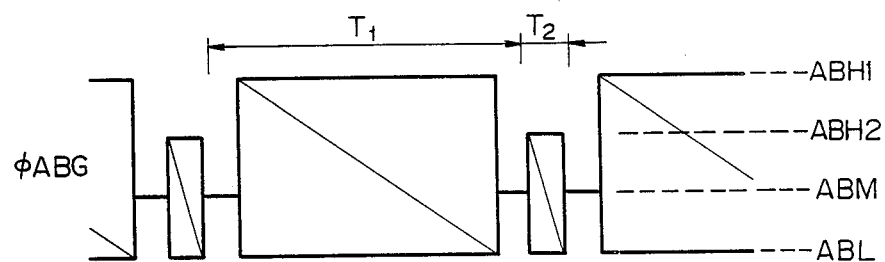
FIG. 7 illustrates the charge exclusion state according to the present invention.

FIG. 7 shows in detail the drive voltage to $\phi$ABG during the electronic shutter operation.

T1 represents a charge storage time for the charges to be excluded, and T2 represents the substantial storage time. If the amount of charge stored during T1 is large, the charges are not completely excluded even the transfer is intermediately of the vertical period, so that residual charges appear on the output image. Especially when the ratio T1/T2 is large, the amount of incident light becomes large. Therefore, it is necessary to reduce the amount of charges to be accumulated during T1. To this end, the potential ABH is made to take different values respectively during T1 and T2, i.e., ABH1 for T1 period and ABH2 for T2 period.

Figure 8:
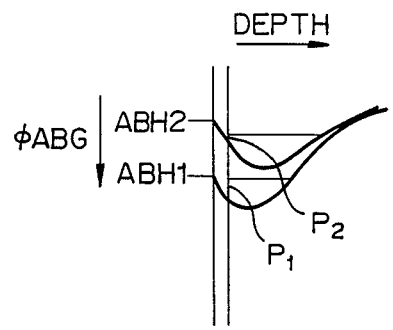
FIG. 8 illustrates the principle of recombination.

FIG. 8 schematically shows a potential graph near the electrode ABG. The right direction indicates that of the substrate depth and the virtual direction indicates the potetial. As the voltage level applied to ABG is changed (i.e., from ABH2 to ABH1), the charges (electrons) beneath the electrode come near the surface. There is the recombination center near the surface so that unnecessary charges are eliminated through recombination. In this case, the amount of charges recombined varies with the level of ABH. At the level ABH2, the charges near P2 are recombined, while at the level ABH1 the charges near P1 are recombined. However, since the depth of P1 is wider than that of P2, more charges are recombined at ABH1 than at ABH2.

Figure 9:
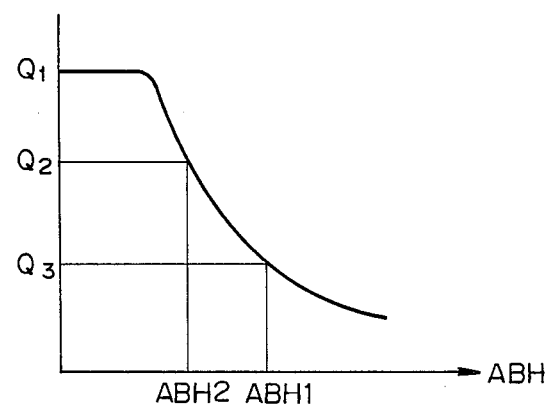
FIG. 9 is a graph showing the relationship between the control voltage for recombination and the amount of saturation charge.

FIG. 9 shows the relation between the level of ABH described above and the amount of charges capable of being accumulated at a pixel, wherein the abscissa denotes the ABH voltage and the ordinate denotes the amount of saturation charges at a pixel.

Q1 is the maximum amount of charges accumulated at a pixel, which is determined based on the physical restrictions such as manufacture process constants and a pixel area. As the ABH voltage is raised from 0, the amount of charge saturation gradually reduces. Normally the level of ABH is set at ABH2 where the amount of saturation charges Q2 is about 75% of the amount of charge saturation Q1 at ABH=0. During storage of unnecessary charges in the electronic shutter operation, the amount of storage charges are reduced by setting the level of ABH, for example, at ABH1 where the lesser amount of charge saturation Q3 is obtained. By virtue of such control, the amount of charge saturation is made small during storage of unnecessary charges.

Figure 10:
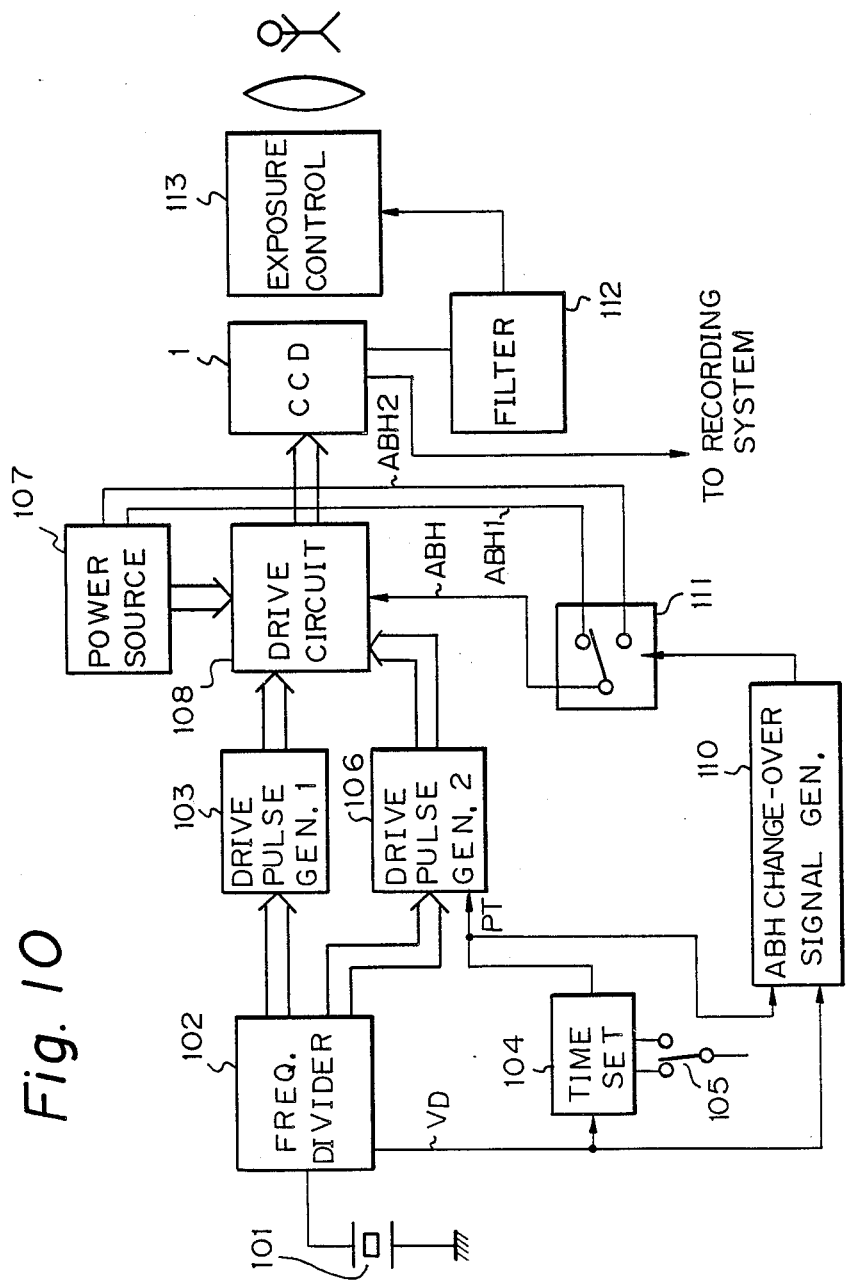
FIG. 10 is a block diagram of the image sensor of the first embodiment.

FIG. 10 shows one example of the control circuit arrangement of the image sensor performing the above-noted control.

Reference numeral 101 represents a reference oscillator, and reference numeral 102 represents a frequency divider. A first drive pulse generator 103 generates drive pulses for use with the storage unit 3, horizontal register 4 and output amplifier 5. A time set circuit 104 sets the substantial storage time. A switch 105 switches the substantial storage time. A second drive pulse generator 106 generates the drive pulses $\phi I$ and $\phi ABG$ for the pickup unit 2. A power source 107 produces various drive voltages for drive of the circuit. A drive circuit 108 generates pulses for drive of the CCD. Reference numeral 1 represents a CCD image sensor, 110 represents an ABH change-over signal generator, and 111 represents a switch circuit. A filter 112 smoothes the output of the sensor 1. An exposure control member 113 servo-controls incident light to the sensor in accordance with the output of the filter 112. The elements 101 to 108, 110 and 111 constitute control means which prevents the amount of charge saturation during storage of charges to be excluded from becoming smaller than that during the substantial storage time. Various pulses are generated by the frequency divider 102 based on the output of the reference oscillator 101, and the drive pulses for the CCD 1 are generated by the drive pulse generators 103 and 104. The drive pulses are in turn subjected to level conversion and power amplification at the drive circuit 108 to drive the CCD 1.

The time set circuit 104 produces a pulse after a delay time (T1 shown in FIG. 6) obtained by subtracting the time (T2 shown in FIG. 6) set by the switch 105 from the vertical period (IV shown in FIG. 6), and sets the substantial storage time T2. As the time T1 shown in FIG. 6 lapses after the start of accumulation, the drive pulse generator 106 generates a pluse $\phi I$ necessary for the vertical transfer upon reception of a pulse form the time set circuit 104. In this case, similarly to the usual case, the pulse $\phi S$ is output once in each horizontal blanking period. The ABH change-over signal generator 110 determines, based upon the signal VD and the output from the time set circuit 104, if it is during the storage of unnecessary charges (T1 period) or during the substantial storage (T2 period). The generator 110 then switches the output of the switch circuit 111 to select ABH, i.e., either ABH1 or ABH2. As a result, under a servo-control of the elements 112 and 113 for maintaining the output level of the CCD sensor 1 constant, such as blooming due to the overflow of unnecessary charges is avoided. The reason for this is that the amount of charge saturation at a pixel is reduced even if the amount of charges stored during the period T1 increases since the ABH1 voltage is applied as shown in FIG. 7 during the period T1. Instead of changing ABH to either ABH1 or ABH2, the amount of unnecessary charges to be excluded may be enhanced by making the frequency of ABH higher.

In the above embodiment, exclusion of unnecessary charges has been described in association with recombination in the single phase frame transfer type CCD. However, the invention is applicable to other systems which enable to change the amount of charges to be accumulated in a pixel by changing the drive voltage.

According to the above embodiment, blooming is hard to occur since the amount of charge saturation during T1 period is made smaller than that during T2 period.

Furthermore, since the ability to exclude unnecessary charged during T1 period is made greater than that during T2 period, a suppression effect against blooming is remarkable even if light of high intensity is applied.

Next, another embodiment for avoiding blooming due to over flow of unnecessary charges will be described with reference to FIGS. 11 to 14, wherein instead of changing the level of $\phi ABG$ during T1 and T2 periods, the potential well distribution in the pickup unit is so formed as to make the amount of charge saturation at a pixel, during storage of unnecessary charges at T1 small. The distribution making the amount of charge saturation at a pixel small means such a potential well distribution that the unnecessary charges during storage are accumulated by concentrating them as much as possible to the wells having a charge exclusion function.

Figure 11:
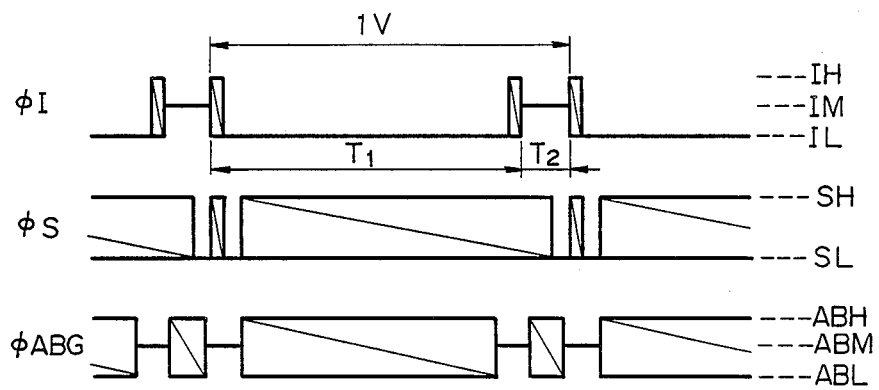
FIG. 11 is a timing chart of a second embodiment in a photographing mode with the storage time of less than 1 field.

FIG. 11 is a timing chart, similar to FIG. 6 of the drive pulses for the image sensor of the embodiment. In FIGS. 11, $\phi I$ is applied with IL level during T1 period and with IM level during T2 period. That is, the potential distributions during light reception at T1 and T2 are made different from each other. In particular, the potential distribution during T1 period is so formed as to make the amount of charge saturation at a pixel small. Such a potential distribution will be described hereinbelow.

Figure 12:
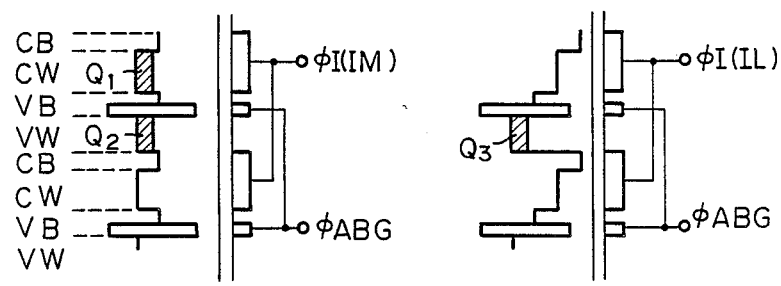
FIGS. 12 (a) and (b) show the examples of the potential distributions, respectively during the T2 period and the T1 period shown in FIG. 11.

FIG. 12 (a) shows the potential distribution at the pickup unit when $\phi I$ is at IM level, while FIG. 12 (b) shows the potential distribution when $\phi I$ is at IL level, similarly to FIG. 4. In FIG. 12 (a), the maximum amount of charges is the sum of the charge Q1 accumulated in CW and the charge Q2 accumulated after the unnecessary charges are excluded upon application of $\phi ABG$, while in FIG. 12 (b) the charge Q1 is not accumulated and only the charge Q3 is accumulated after the unnecessary charges are excluded upon application of $\phi ABG$. Consequently, the amount of charges to be excluded reduces so that blooming occurring during the vertical transfer is avoided. In particular, in FIG. 12 (b), since unnecessary charges are concentrated to the wells (wells provided with an ABG electrode), the amount of charge saturation becomes small.

Figure 13:
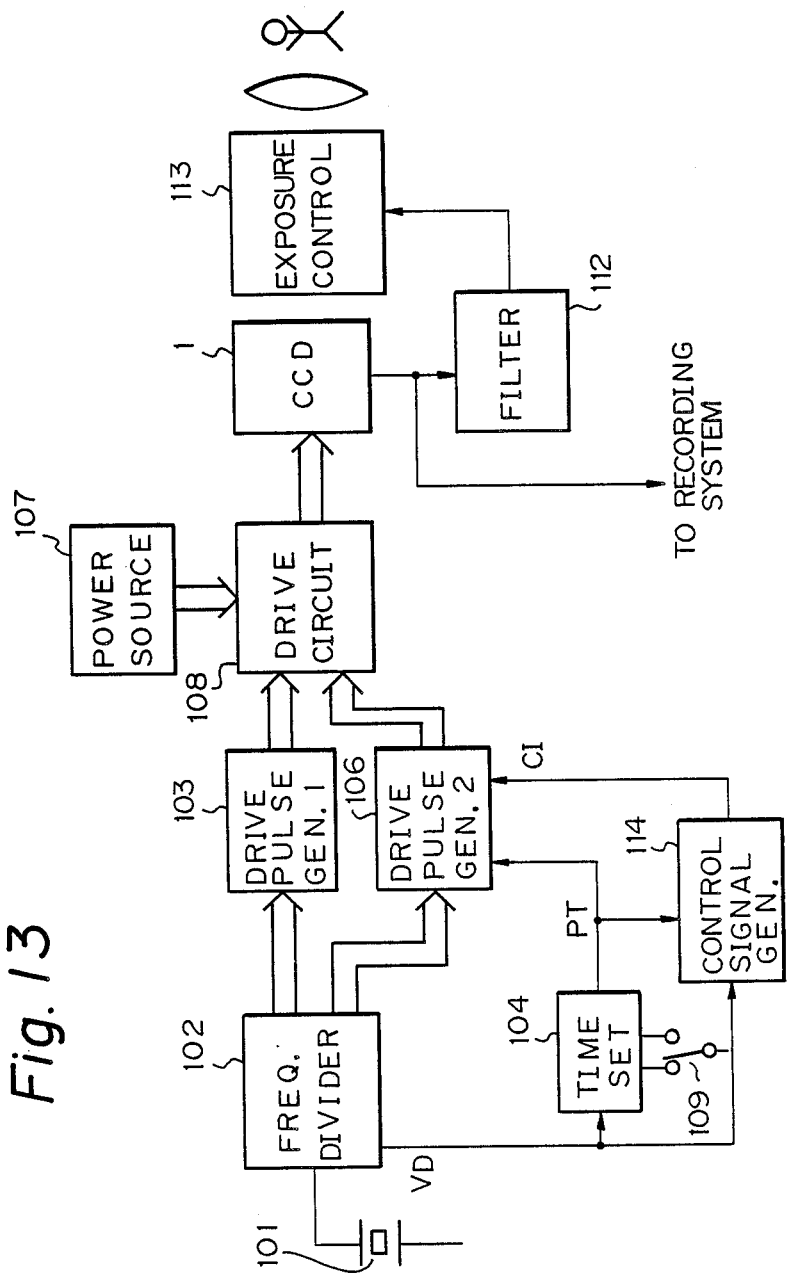
FIG. 13 is a block diagram showing the second embodiment of the image sensor according to the invention.

FIG. 13 is a block diagram showing an example of the image sensor realizing the drive waveforms shown in FIG. 11. In FIG. 13, the elements having the same function as that of the elements shown in FIG. 10 have been designated by identical reference numerals, and the description therefor is omitted.

In FIG. 13, a control signal generator 114 sends a signal CI to the second drive pulse generator 106, the signal CI determining the level of $\phi I$ the circuit 106 generates. The control signal generator 114 generates the signal CI based upon a pulse VD output from the frequency divider 102 and indicating the vertical period and a pulse PT output from the time set circuit 104. FIG. 14 is a timing chart for explaining the operation of the control signal generator 114.

In FIG. 14, $T_0$ represents one vertical period, which is defined as a period from the trailing edge of the pulse VD output from the frequency divider 102 to the following trailing edge. The pulse PT is a signal from the time set circuit 104 and falls down after a lapse of T1 after the pulse VD rises up, i.e., after a lapse of the time obtained by subtracting the substantial storage time T2 from T1. The control signal generator 114 generates the control signal CI which maintains a high level during the time from when the pulse VD falls down to when the pulse PI falls down, and a low level during the time from when the pulse PI falls down to when the pulse VD falls down. The second drive pulse generator 106 supplies a signal to the drive circuit 108 so as to change the level of a signal to be applied to the electrode $\phi I$ of FIG. 12 in accordance with the level of the generated control signal CI. In other words, while the control signal CI is at a high level, the level of the signal applied to the electrode $\phi I$ is changed to a low level as indicated by IL. Thus, the potential well distribution is formed as shown in FIG. 12 (b) to make the amount of charge saturation small. Contrary, while the control signal is at a low level, the level of the signal applied to the electrode $\phi I$ is changed to a higher level as indicated by IM than the low level IL. Thus, the potential well distribution is formed as shown in FIG. 12 (a). An RS flip-flop as shown in FIG. 15 may be provided for obtaining the pulse CI from the pulses VD and PI, the flip-flop is reset by the trailing edge of the pulse VD and set by the trailing edge of the pulse PI.

In the above embodiment, exclusion of unnecessary charges has been described in association with recombination in the single phase frame transfer type CCD. However, the invention is applicable to other systems which enable to change the potential distribution by changing the drive conditions.

In the above embodiment, the virtual regions VB and VW are respectively provided with anti-blooming gate electrodes, and the potential levels of the drive regions CB and CW are raised with respect to electrons higher than those of the virtual regions VB and VW during T1 period. However, in case the anti-blooming gate electrodes ABG are provided on the side of the drive regions, the potential levels of the drive regions CB and CW are lowered with respect to electrons more than those of the regions VB and VW. In particular, during storage of unnecessary charges at T1 period, the potential level on the side of the regions with anti-blooming gate electrodes is lowered more than that on the side of the regions without anti-blooming gate electrodes. By doing so, unnecessary charges are collected to the side of the regions with anti-blooming gate electrodes, which is equivalent in operation to make the amount of charge saturation at a pixel small, thereby avoiding blooming. In case overflow drains are provided in place of anti-blooming gate electrodes, a potential distribution may be employed which effects to concentrate unnecessary charges to the overflow drains during storage of the unnecessary charges at T1 period.

According to the above embodiment, the conditions of charge storage at T1 and T2 periods are varied, i.e., the amount of charge saturation during T1 period is made smaller than that during T2 period. Therefore, blooming is hard to occur. In addition, blooming is avoided without substantial change in power consumption of the image sensor.

In the first and second embodiments described above after a lapse of T1 the vertical transfer of the pickup unit 2 only is carried out, and unnecessary charges are accumulated at the border between the pickup unit 2 and the storage unit 3. However, if the amount of charges is large, the charges accumulated in the border between the pickup unit 2 and the storage unit 3 enter into the pickup unit 2 and mixed with the charges accumulated during T2 period. Thus, there may arise a problem; i.e., the more the charges are accumulated in the pickup unit 2, the greater the charges in the storage unit 3 are affected.

Next, an embodiment solving such a problem will be described with reference to FIGS. 16 to 23. In this embodiment, a buffer unit corresponding in capacity at least more than one line, is provided between the pickup unit and the storage unit of a frame transfer type CCD. The charges generated in the pickup unit during T1 period are transferred to the buffer unit while the accumulated charges in the storage unit is read. Thereafter, the charges generated during T2 period are transferred from the pickup unit to the storage unit. By performing such transfer, the unnecessary charges transferred to the buffer unit are excluded.

In FIG. 16, the elements having the same function as that of the elements shown in FIG. 1 have been designated by identical reference numerals to those in FIG. 1, and the description therefor is omitted. In the figure, reference numeral 211 represents the buffer unit having the same electrode arrangement as that of the pickup unit 2, and the buffer unit 211 is shielded from light and has a capacity corresponding to at least one line pixels. $\phi I$ and $\phi ABG$ are similarly provided in this embodiment also.

In driving the frame transfer type CCD 1 constructed as above in synchronism with the television periods, the charges produced and accumulated by the pickup unit are vertically transferred therefrom via the buffer unit 211 to the storage unit 3 during the television vertical blanking period. The charges stored in the storage unit 3 are stepwise transferred to the horizontal register 4 by one line during the horizontal blanking period. The charges in the horizontal register 4 are horizontally transferred to the output amplifier 5 during a one line horizontal period.

Figure 17:
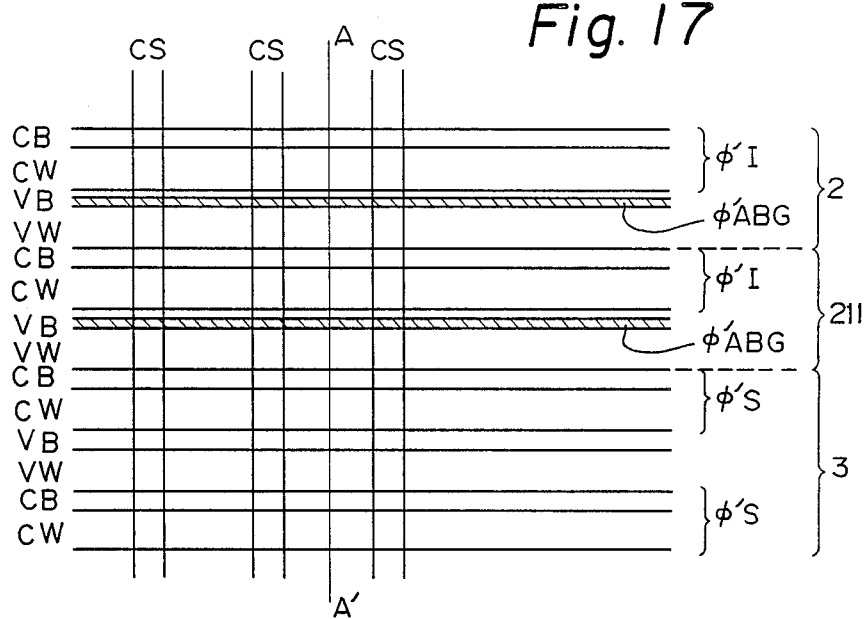
FIG. 17 is the main part showing the electrode arrangement of FIG. 16.
Figure 18:
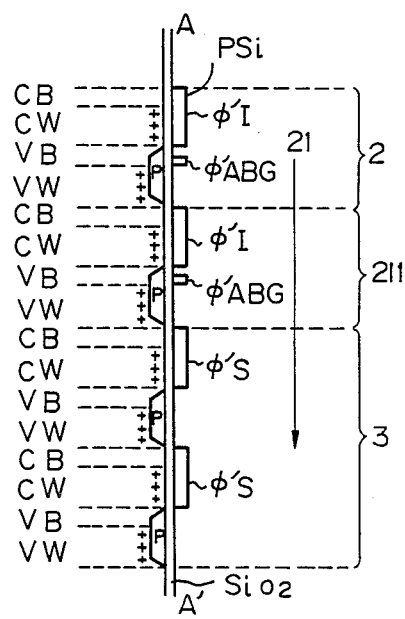
FIG. 18 is a schematic and cross-sectional illustration of FIG. 17.
Figure 19:
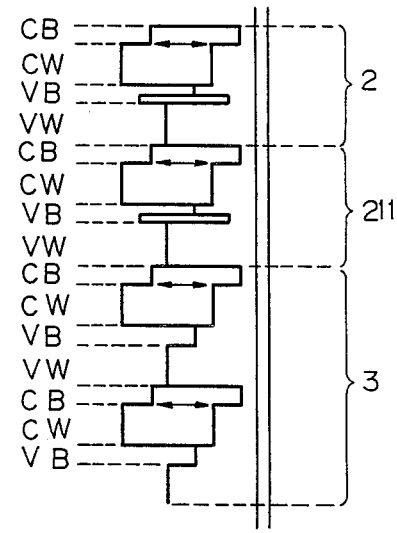
FIG. 19 shows the potential distribution of FIG. 18.

FIGS. 17 to 19 correspond to FIGS. 2 to 4. The difference between the embodiments resides in that the buffer unit 112 shielded from light is provided which has the same construction as of the pickup unit 2. The other elements are the same as described with FIGS. 2 to 4, and the description therefor is omitted herein.

The operation of the embodiment constructed as above will be described with the timing charts of FIGS. 20 and 21.

Figure 20:
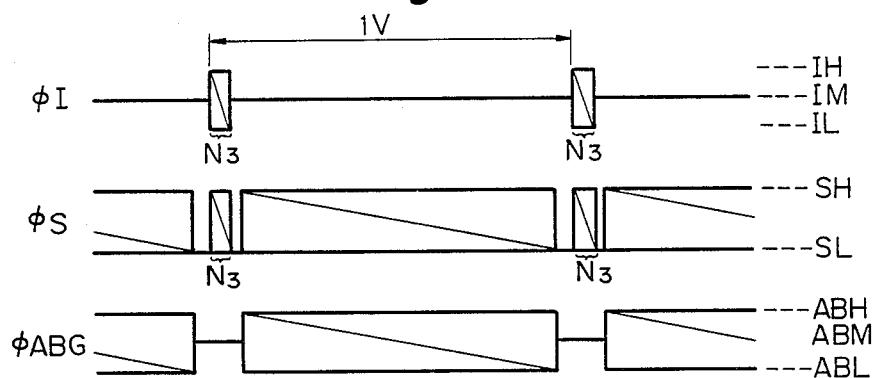
FIG. 20 is a timing chart of the third embodiment in a movie photographing mode with the storage time of 1 field.

FIG. 20 shows the timing chart during the usual operation similarly to the timing chart of FIG. 5. In this embodiment, since the buffer unit 211 is provided, the operation during transfer for each IV is performed in the following.

$\phi I$ is supplied with N3 transfer pulses the same in number as the sum of the number N1 of rows in the pick-up unit 2 and the number N2 of rows in the buffer unit 211, at the start of the vertical period. Similarly to the above-described embodiment, $\phi I$ takes a middle value IM during the charge storage period except the period the transfer pulse is being supplied. During the storage period, the potential at CW becomes substantially the same as that at VW so that charges are accumulated at both CW and VW. During transfer, the respective charges accumulated in CW and VW are automatically added. In this case, the combination of addition of the charges during transfer is changed and shifted at every field to ensure a change in position of sensitivity gravity center, thus performing an interlace operation.

Simultaneously with the transfer pulse $\phi I$, the electrode $\phi S$ is supplied with N3 transfer pulses due to the provision of the buffer unit 211 to carry out charge transfer from the pickup unit to the storage unit via the buffer unit 211. Thereafter, upon reception of a shift pulse occurring once for each horizontal period 1H, the charges are transferred from the storage unit to the horizontal register.

Since the electrode $\phi S$ is supplied with N3 transfer pulses, the charges accumulated in the buffer unit 211 flow through the horizontal register 4 to unrepresented drains provided on the opposite side of the storage unit 3 relative to the horizontal register 4, and are excluded. Such drains are described in detail in U.S. Ser. No. 389,920 filed on June 18, 1982 and assigned to Canon.

As similar to the above-described embodiment $\phi ABG$ is fixed during the vertical transfer at a middle potential ABM between the virtual potentials of the regions VB and VW in order not to interrupt the vertical transfer. During the other period, $\phi ABG$ is supplied with consecutive pulses of about 500 KHZ to 2MHz in order to exclude unnecessary charges higher than a preset level by means of charge recombination.

Figure 21:
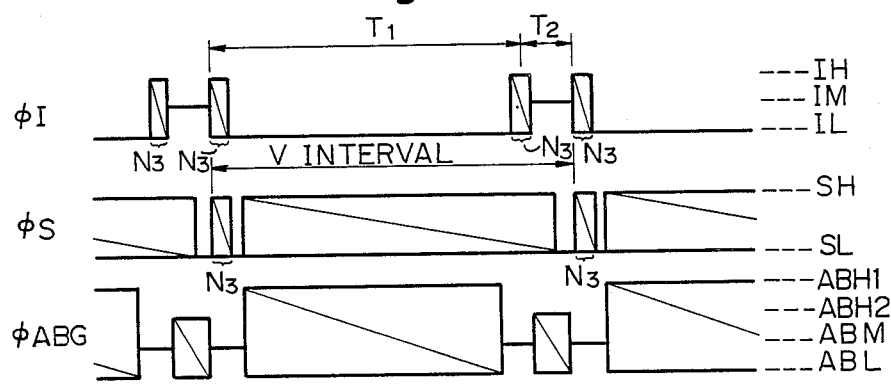
FIG. 21 is a timing chart of the third embodiment in a movie photographing mode with the storage time of less than 1 field.

FIG. 21 corresponds to FIG. 6 and shows a timing chart of the drive voltage waveforms during a so-called electronic shutter operation wherein by performing a vertical transfer during storage and reducing the substantial storage time, a storage time shorter than one field is obtained.

$\phi I$ is applied with N3 vertical transfer pulses intermediately of the vertical period, which is different from the case with FIG. 20. The charges accumulated during T1 period are excluded in response to the vertical transfer pulse from the pickup unit and accumulated in the buffer unit 211, so that T2 becomes the substantial storage time.

The level of $\phi ABG$ is temporarily set at a middle value during the vertical transfer period. T1 represents the storage time of the charges to be excluded as described above, and T2 represents the substantial storage time. If the amount of charges accumulated during T1 is large, the charges are not completely excluded even if the transfer operation is carried out intermediately of the storage period, so that residual charges appear on the output image. Therefore, in this embodiment, similarly to the first embodiment shown in FIGS. 1 to 10, the voltage ABH is changed at T1 and T2 periods, i.e., ABH1 for the period T1 and ABH2 for the period T2, thus changing the amount of charge saturation at a pixel to avoid blooming.

In this embodiment, similarly to the second embodiment shown with FIGS. 11 to 15, the potential at the electrode $\phi I$ in the pickup unit is set at IL level during T1 period and at IM level during T2 period. In other words, the potential distributions at T1 and T2 while receiving light is made different from each other to make the amounts of charge saturation different from each other.

In this embodiment, the charges having been accumulated in the pickup unit 2 until the vertical transfer is performed after the lapse of T1, are all transferred to the buffer unit 211. All of the charges accumulated in the pickup unit 2 are transferred to the buffer unit 211 which as described previously has a capacity corresponding to at least more than one line of pixels. Therefore, although the charges in the buffer unit 211 are of a overflow state, the charges do not flow into the storage unit 3 because of the provision of the barrier region CB provided between the buffer unit 211 and the storage unit 3, thereby rendering the charges in a overflow state remain in the buffer unit 211 and preventing the charges from entering into the pickup unit 2. Use of a larger number of lines of the buffer unit 211 enables to more effectively prevent the charges from entering the pickup unit 2.

During the vertical transfer carried out after T2 period, N3 transfer pulses, which are the sum of the number N1 of rows in the pickup unit 2 and the number N2 of rows in the buffer unit 211, are applied. In this case, during the transfer, the charges in the buffer unit 211 are transferred to the bottom line of the storage unit 3, and only those charges accumulated in the pickup unit 2 remain in the storage unit 3. Therefore, during the above transfer, the charges transferred to the buffer unit 211 at the end of the T1 period are excluded as unnecessary charges.

Next, the arrangement of the image sensor performing such control will be described with reference to FIG. 22. In the figure, the elements having the same function as that of the elements shown in FIG. 10 have been designated by the identical reference numerals to those in FIG. 10, and the description therefor is omitted.

Figure 22:
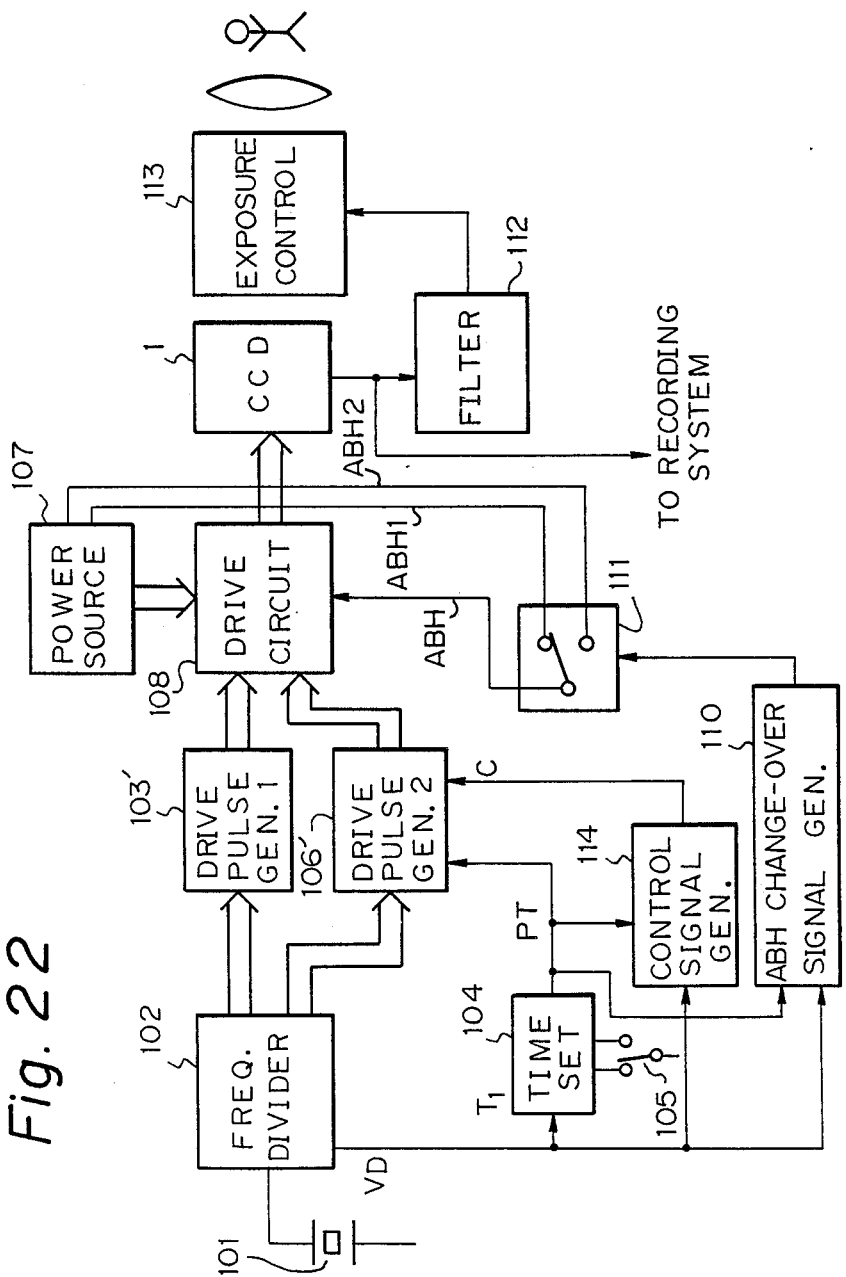
FIG. 22 is a block diagram showing the third embodiment of the image sensor.

In FIG. 22, reference numerals 103' and 106' respectively represent first and second drive pulse generators for drive of the pickup unit 2, buffer unit 211 and storage unit 3. Although the drive pulse generators 103' and 106' are of the same circuit arrangement as of the generators 103 and 106 shown in FIG. 10, there is a distinctive difference therebetween in that the number of pulses generated as $\phi I$ and $\phi S$ during the vertical transfer carried out after the lapse of T1 and T2, is larger by the number N2 of rows in the buffer unit 112. Except the operation associated with the pulses applied to $\phi I$ and $\phi S$ during the vertical transfer, the other operation of the embodiment is the same as that described with FIGS. 10 and 13, and the description therefor is omitted.

According to the embodiment described in the foregoing, since the methods incorporated in the first and second embodiments are used together, the amount of charges accumulated in the pickup unit 2 is reduced further, as compared with the first and second embodiments, thereby avoiding blooming due to overflow during T1 period. Furthermore, the buffer unit 211 made of at least more than one line pixels is provided between the pickup unit 2 and the storage unit 3, and the charges in the pickup unit 2 are temporarily transferred to the buffer unit 2. Therefore, the adverse influence upon the charges accumulated in the pickup unit 2 during T2 period is minimized.

Any construction may suffice as the buffer unit 211 of the embodiment so long as a vertical transfer function is available. It is preferable to have such a construction avoiding blooming.

In the above embodiment, although exclusion of excessive charges have been described through recombination in the single phase frame transfer type CCD, the invention is also applicable to other systems which can change the amount of charges to be accumulated in a pixel by changing the drive voltages.

What we claim is:

1. An apparatus comprising:
   (a) storage means for converting incident radiation into an electrical signal and storing said electrical signal, said signal means taking a first state having a large amount of saturation and a second state having a small amount of saturation; and
   (b) control means for setting, during a first period for storing a necessary electrical signal in said storing means and a second period for storing an unnecessary electrical signal, said storage means at said first state during said first period and at said second state during said second period.

2. An apparatus of claim 1, wherein said storage means is made of a semiconductor element, and said electrical signal is stored in a potential well.

3. An apparatus of claim 2, wherein said first state is a state which forms a potential well having a large amount of saturation of said electrical signal, and said second state is a state which forms a potential well having a smaller amount of saturation of said electrical signal than that during said first state.

4. An apparatus of claim 2 further comprising recombination means for eliminating through recombination said electrical signal stored in said potential well.

5. An apparatus of claim 4 further comprising switching means for switching said first and second states by changing the operation condition of said recombination means.

6. An apparatus of claim 5, wherein said switching means enhances the recombination ability per unit time of said recombination means during said second state more than that during said first state.

7. An apparatus of claim 6, wherein said switching means enhances the recombination ability by changing a voltage applied to said recombination means.

8. An apparatus of claim 7, wherein said switching means enhances the recombination ability by raising the frequency of said voltage to said recombination means.

9. An apparatus of claim 1, further comprising means for reading out said electrical signal stored during said first period and for recording said electrical signal.

10. An image pickup device comprising:
    (a) an image part for converting incident radiation into an electrical signal and storing said electric signal;
    (b) a storage part, to which said electrical signal stored in said image part is transferred, for holding said transferred electrical signal;
    (c) a buffer part provided between said image part and said storage part, to which said electrical signal stored in said image part is transferred;
    (d) control means for taking a first drive mode for transferring said electrical signal stored in said image part to said storage part by driving said image part, said storage part and said buffer part, and a second drive mode for transferring said electrical signal stored in said image part to said buffer part by driving only said image part and said buffer part;
    (e) means for rendering said control means alternately to take said first and second drive modes; and
    (f) means for reducing the amount of charge saturation of said image part after operating said control means at said second drive mode.

11. An image pickup device of claim 10, wherein said reduction means reduces the amount of charge saturation by changing the potential distribution of said image part.

12. An image pickup device of claim 10, wherein said reduction means eliminates said electrical signal of said image part by means of recombination, and enhances the recombination ability per unit time after operating said control means at said second drive mode more than that after operating said control means at said first drive mode.

13. An image pickup device of claim 12, wherein said reduction means enhances the recombination ability by changing a voltage to said recombination means.

14. An image pickup device of claim 13, wherein said reduction means enhances the recombination ability by raising the frequency of said voltage to said recombination means.

15. An image pickup device of claim 10, further comprising recording means for reading out said electrical signal stored in said storage part and for recording said electrical signal.

16. A device comprising:
    (a) means for converting incident radiation into an electrical signal and storing said electrical signal in a storage means, said storage means storing said electrical signal in a potential well;
    (b) exclusion means for excluding the charges stored in a potential well; and
    (c) control means for taking a first mode which forms a potential well in said storage means in which well said electrical signal is stored and a second mode which forms a potential well from which said electrical signal to be excluded by said exclusion means is more readily excluded than said first mode.

17. A device of claim 16, wherein said exclusion means is recombination means for recombining said electrical signal.

18. A device of claim 16, wherein said potential well from which said electrical signal is more readily excluded has the potential distribution that said electrical signal is concentrated near said exclusion means.

19. A device of claim 17, wherein said potential well from which said electrical signal is more readily excluded has the potential distribution that said electrical signal is concentrated near said exclusion means.

20. A device of claim 16, wherein said recombination means enhances the recombination ability per unit time when said first mode is selected by said control means more than said second mode.

21. An image pickup device of claim 16, further comprising recording means for reading out said electrical signal stored in said storage means and for recording said electrical signal.

22. A device comprising:
    (a) means for converting incident radiation into an electrical signal and storing said electrical signal in a storage means, said storage means storing said electrical signal in a potential well;
    (b) exclusion means for excluding the charges stored in said potential well; and
    (c) control means for setting, during a first period for storing a necessary electrical signal in said converting means and a second period for storing an unnecessary electrical signal in said converting means, said exclusion means at a higher exclusion ability during said second period than said first period.

23. A device of claim 22, wherein said exclusion means excludes said electrical signal by means of recombination.

24. A device of claim 23, wherein said exclusion means enhances the exclusion ability by raising a voltage for recombination.

25. A device of claim 22 further comprising means for controlling a state of said potential well, said control means taking a first mode for forming a potential well state said electrical signal is stored, and a second mode for forming a potential well state said electrical signal is more readily excluded by said exclusion means than said first mode.

26. A device of claim 25, wherein said control means takes said first mode during said firs period and said second mode during said second period.

27. A device of claim 26, wherein said potential state said electrical signal is more readily excluded has the potential distribution that said electrical signal is concentration near said exclusion means.

28. An image pickup device of claim 22, further comprising recording means for reading out said electrical signal stored in said storage means and for recording said electrical signals 29. An apparatus comprising:
(a) conversion means for converting incident radiation into an electrical signal and storing said electrical signal;
(b) first control means for operating, during a predetermined period including a first period and a following second period, to exclude said electrical signal stored during said first period and read said electrical signal stored during said second period; and
(c) second control means for changing, during storage operation of said conversion means, the saturation level of said conversion means between said first period and said second period.

30. An apparatus of claim 29, wherein said second control means eliminates through recombination said electrical signal stored during said first and said second period in said conversion means.

31. An apparatus of claim 29, wherein said conversion means is made of a semiconductor, and said electrical signal is stored in a potential well.

32. An apparatus of claim 31, wherein said second control means changes the potential well state between said first and said second period.

33. An image pickup device of claim 29, further comprising recording means for reading out said electrical signal stored in said conversion means and for recording said electrical signal.

34. An image pickup apparatus comprising:
(a) an image part for converting incident radiation into an electrical signal and storing said electrical signal;
(b) a first storage part for storing said electrical signal of said image part;
(c) a second storage part for storing said electrical signal of said first storage part;
(d) read out means for reading out said electrical signal from said second storage part;
(e) control means for controlling transferring of an electrical signal, said control means having a first mode for periodically transferring an electrical signal from said image part to said second storage part through said first storage part in a vertical blanking period of standard television period, a second mode for reading out said electrical signal form said second storage part as a field signal after said first mode, and a third mode for transferring an electrical signal from said image part to said first storage part during said second mode; and
(f) selecting means for selecting a storing period of said electrical signal in said image part, said selecting means selects at least a first selecting mode for allowing said control means to control transferring in said first to said third mode and a second selecting mode for allowing said control means to control transferring in said first and said second mode without said third mode.

35. An image pickup apparatus of claim 34, further comprising recording means for recording said electrical signal read out from said second storage part.

36. An image pickup apparatus of claim 34, further comprising exposure control means for controlling an exposure on said image part according to said electrical signal read out from said second part.

37. An image pickup apparatus of claim 34, wherein said image part, said first and second storage parts and said read-out means comprise charge coupled devices.

38. An image pickup apparatus of claim 34, further comprising saturation level control means for changing the control condition of the saturation level in an electrical signal at said image part between said first and second selecting modes.

39. An image pickup apparatus of claim 38, wherein aid saturation level control means comprises means for recombining said electrical signal with another electrical signal.

40. An image pickup apparatus of claim 38, wherein said saturation level control means comprises means for controlling a potential state of said image part.

* * * * *

UNITED STATES PATENT AND TRADEMARK OFFICE
CERTIFICATE OF CORRECTION

PATENT NO. : 4,845,568

DATED : July 4, 1989

INVENTOR(S) : Hieda et al.

It is certified that error appears in the above-identified patent and that said Letters Patent is hereby corrected as shown below:

IN THE ABSTRACT [57]:
  Line 4, change "substantialy" to --substantial--.

COLUMN 1
  Line 30, change "charged" to --charges--.
  Line 35, change "since for example" to --since, for example,--.

COLUMN 2
  Line 27, change "FIG. 18. is" to --FIG. 18 is--.

COLUMN 3
  Line 44, delete "an".

COLUMN 4
  Line 20, change "I is applied" to -- $\phi'I$ is applied--.

COLUMN 6
  Line 40, change "similarly" to --similar--.

COLUMN 11
  Line 5, change "said signal means" to --said storage means--.
  Line 23, change "claim 2" to --claim 2,--.
  Line 26, change "claim 4" to --claim 4,--.
  Line 45, change "storing said electric" to --storing said electrical--.

COLUMN 12
  Line 46, change "claim 16," to --claim 17,--.

UNITED STATES PATENT AND TRADEMARK OFFICE
CERTIFICATE OF CORRECTION

PATENT NO. : 4,845,568

DATED : July 4, 1989

INVENTOR(S) : Hieda et al.

It is certified that error appears in the above-identified patent and that said Letters Patent is hereby corrected as shown below:

COLUMN 13
  Line 7, change "claim 22" to --claim 22,--.
  Line 15, change "firs" to --first--.
  Line 20, change "centration" to --centrated--.
  Line 24, change "signals" to --signals.--.

COLUMN 14
  Line 18, change "form" to --from--.
  Line 46, change "aid" to --said--.

Signed and Sealed this

Nineteenth Day of June, 1990

Attest:

HARRY F. MANBECK, JR.

Attesting Officer

Commissioner of Patents and Trademarks